United States Patent
Sahoo

(10) Patent No.: US 10,661,200 B2
(45) Date of Patent: May 26, 2020

(54) INDUSTRIAL OIL DEGASSING SYSTEM AND METHOD

(71) Applicant: General Electric Technology GmbH, Baden (CH)

(72) Inventor: Rajani-Kanta Sahoo, Baden (CH)

(73) Assignee: General Electric Company, Schenectady, NY (US)

( * ) Notice: Subject to any disclaimer, the term of this patent is extended or adjusted under 35 U.S.C. 154(b) by 87 days.

(21) Appl. No.: 15/591,807

(22) Filed: May 10, 2017

(65) Prior Publication Data

US 2017/0326475 A1  Nov. 16, 2017

(51) Int. Cl.
*B01D 19/00* (2006.01)
*F16N 39/00* (2006.01)

(52) U.S. Cl.
CPC ..... *B01D 19/0036* (2013.01); *B01D 19/0063* (2013.01); *F16N 39/002* (2013.01); *F16N 39/005* (2013.01)

(58) Field of Classification Search
CPC .. B01D 19/0036; B01D 19/0063; B01D 3/06; B01D 1/26; B01D 1/305; B01D 3/007; B01D 3/065; B01D 3/42; B01D 11/0403; B01D 11/0426; B01D 3/40; B01D 53/48; B01D 53/62; F16N 39/002; F16N 39/005; H02K 5/124; H02K 9/19; H02K 9/20
See application file for complete search history.

(56) References Cited

U.S. PATENT DOCUMENTS

2012/0098206 A1* 4/2012 Ajioka .................. H02K 5/124
 277/432
2014/0314545 A1* 10/2014 Auber .................. F04D 29/124
 415/112

FOREIGN PATENT DOCUMENTS

DE   1 055 309 B    4/1959
EP   2 079 151 A1   7/2009

OTHER PUBLICATIONS

Extended European Search Report and Opinion issued in connection with corresponding EP Application No. 16168876.7 dated Aug. 23, 2016.

* cited by examiner

*Primary Examiner* — Sharon Pregler
(74) *Attorney, Agent, or Firm* — James W. Pemrick; Charlotte C. Wilson

(57) ABSTRACT

An industrial oil degassing system and method to remove gas from an industrial machine oil. Described is an industrial oil degassing system, including a pressure tank under pressure to receive oil charged with gas, a separation tank with an atmospheric pressure to separate gas from the oil, and a seal oil tank with an atmospheric pressure to receive the degassed oil from the separation tank. Further described is a method for industrial degassing of oil with the steps of exerting a pressure to a pressure tank, supplying the oil to the pressure tank, supplying the oil from the pressure tank to a separation tank with atmospheric pressure, separating gas from the oil in the separation tank, and supplying the degassed oil to a seal oil tank with atmospheric pressure.

10 Claims, 2 Drawing Sheets

INDUSTRIAL OIL DEGASSING SYSTEM AND METHOD

TECHNICAL FIELD

The present disclosure relates to an industrial oil degassing system and to a method to remove gas from an industrial machine oil. In particular, the disclosure refers to a degassing system to remove gas from a seal oil for a turbogenerator.

BACKGROUND

In the industrial field, often, gases are used to cool machines, for example by air or hydrogen. A pressure is exerted on the cooling gas to move the gas through the machine. To prevent leakage of the gas a machine oil can be provided, especially a seal oil. In particular in the field of turbogenerators which generate high power for the public grid an oil seal is provided around the shaft of the turbogenerator to maintain hydrogen pressure inside the turbogenerator. A thin film of seal oil or oil around the shaft prevents hydrogen gas from escaping the turbogenerator. Specific seal oil systems are designed to guarantee the operability of the seal oil in operation. These seal oil systems have to satisfy several functions, as to maintain the oil pressure, slightly higher than the gas pressure of the turbogenerator, to maintain the oil temperature, and to maintain the oil quality. Further functions of the seal oil system comprise adequately segregating the gas side return oil from the air side return oil, removing of oil mists, to prevent mixture of air and gas, to follow the regulations of explosive environments. The process of removing trapped gas or air is called degassing. The operation is performed in two separate tanks to avoid an explosive mixture, air mixed with hydrogen. Further, to prevent oil flow along the shaft inside the turbogenerator. A common seal oil system or oil degassing system for a turbogenerator comprises a degassing tank to receive oil from a drive end of the turbogenerator, another degassing tank to receive oil from a non-drive end, a degassing tank open to the atmosphere, and a vacuum tank to receive oil from the three mentioned tanks. This seal oil system further comprises pumps, coolers or heat exchangers to remove heat from the oil, and strainers or filters. The seal oil system provides the required sealing against the leakage of hydrogen gas from the turbogenerator. Lubricating oil is provided into the shaft of the turbogenerator. The oil pressure is maintained slightly higher than the gas pressure. Typical values of the gas pressure inside the turbogenerator are 5 bars and the oil pressure is 0.3 to 0.5 bars higher. Oil is supplied to both drive end and to the non-drive end of the turbogenerator which is then split into two sides of the seal ring, the air side and the gas side. Return oil from the gas side of both drive end and non-drive end are collected in two separate tanks called degassing tanks. These degassing tanks are designed as pressure tanks to withstand high oil pressures. Return oil from the air side from both the drive end and the non-drive end are manifolded and collected in a further tank. The further tank in this state of the art example is also designed as a pressure vessel and maintained at a negative pressure with the help of suction fans or pumps in order to remove residual air. A further tank is provided which contains a vacuum and maintains a constant vacuum by means of pumps. The oil from the before mentioned three degassing tanks is sucked into the vacuum tank. This seal oil system to degas the oil has a substantial cost of materials related to the number of tanks and especially one tank to provide a vacuum.

SUMMARY

It is an object of embodiments of the invention to provide a simplified and cost-saving oil degassing system and a method to industrially degas oil. This object is solved with the features of an oil degassing system and a method for industrial degassing of oil according to the independent claims.

Further examples of the invention are disclosed in the dependent claims.

In an example the oil received by the pressure tank is supplied by a drive end inlet of a turbogenerator and by a non-drive end inlet of the turbogenerator. The terms drive end and non-drive end refer to the rotor of the turbogenerator and are common in the technical field. The inlets are tubes connected with the oil system of the turbogenerator.

In a further example the oil received by the seal oil tank is supplied by a further inlet from the drive end and the non-drive end, and from an outlet of the pressure tank. The further inlet supplies oil from the turbogenerator which may contain air. The outlet of the pressure tank supplies oil to the seal oil tank which is essentially free from hydrogen in the oil.

In another example the pressure tank has a connected oil mist separator from which oil drips into the pressure tank and the oil mist separator comprises at least a fan to create a pressure inside the pressure tank.

In a further example the pressure tank houses a perforated wall for damping the pressure of different inlets to the pressure tank.

In another example of the invention at least a cooler controlled by a temperature control valve achieves the mixing of hot and cold oil within the seal oil tank. By this means unwanted effects caused by temperature differences in the seal oil tank are avoided.

In another example pipes to return the oil after degassing are equipped with a siphon. These are the pipes behind the seal oil tank in the flow direction. The siphon supports the flow of the oil towards the turbogenerator to return the degassed oil. Moreover, the drive end inlet can be connected with the non-drive end inlet by a siphon to support a damping of a pressure difference between these inlets.

In a further example the separation tank contains hydrogen to be degassed and the seal oil tank contains air to be degassed. In the separation tank mainly hydrogen is removed from the oil, in the seal oil tank mainly air is degassed from the oil.

BRIEF DESCRIPTION OF THE DRAWINGS

Further characteristics and advantages will be more apparent from the description of non-exclusive embodiments of the oil degassing system and the method to degas oil, illustrated by way of non-limiting example in the accompanying drawings, in which.

DETAILED DESCRIPTION

Figure 1:
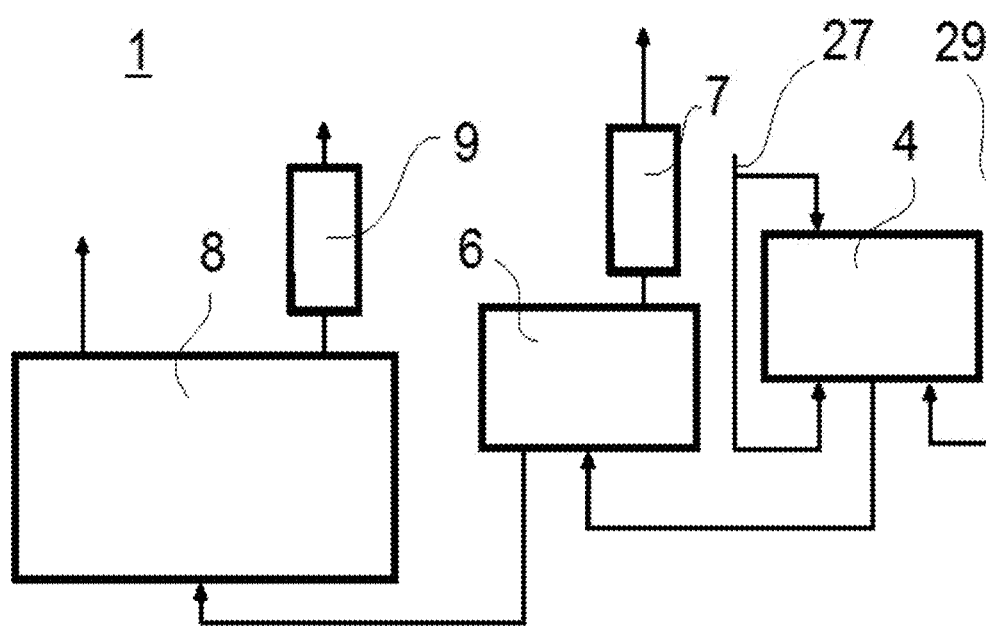
FIG. 1 shows a block diagram of an example of an industrial degassing system with a pressure tank to receive machine oil charged with gas from a drive-end and a non-drive end of a turbogenerator, a separation tank with oil mist separator to remove the gas from the oil, and a seal oil tank with an atmospheric pressure with another oil mist separator.

FIG. 1 shows a block diagram of an example of an industrial oil degassing system 1 which is used to clean a machine oil from a gas. The oil degassing system 1 can be used for a manifold of applications in the industrial environment in which a cooling gas contaminates an industrial oil. Here, the oil degassing system 1 is described in context with a gas-cooled turbogenerator 25. In embodiments, the gas for cooling the turbogenerator 25 is hydrogen. To prevent the gas from escaping and thus to maintain the hydrogen pressure, a specific seal oil or oil is provided around the shaft of the turbogenerator 25. A pressure tank 4 at the right in FIG. 1 receives seal oil charged with gas from the turbogenerator 25, more precisely from a drive end and the opposed non-drive end of the turbogenerator 25. The pressure tank 4 contains a pressure higher than the pressure in the environment. The seal oil is introduced to the pressure tank 4 via a drive end inlet 27 and a non-drive end inlet 29. The possible differential pressure between the two inlets is nullified. This is done in the pressure tank 4 by means of a perforated wall inside the pressure tank 4 for example. Optionally, the pressure tank 4 can be designed with a siphon (not shown) which connects return pipes or tubes from both drive end and non-drive end. The seal oil is fed from the pressure tank 4 to a separation tank 6 or stilling tank next to the pressure tank 4 via tubes. The pressure in the separation tank 6 is lower than the pressure in the pressure tank 4 and around atmospheric pressure. This is a difference to common systems in which both tanks are designed as pressure tanks in which a pressure is created and sustained. The oil transport from the pressure tank 4 to the separation tank 6 is accomplished without further means due to the pressure difference. By virtue of the pressure difference between the pressure tank 4 and the separation tank 6 no oil flows back to the pressure tank 4. Moreover, optionally the pressure tank 4 and the separation tank 6 can be arranged with a height difference to supplement a natural flow of the oil. The separation tank 6 has an assigned oil mist separator 7 which removes the gas dissolved in the oil. The oil mist separator 7 can be designed as a known strainer based device that uses at least a fan to create a small negative pressure inside the oil mist separator 7. The separation tank 6 and the oil mist separator 7 form a functional unity. The degassed oil is transported from the separation tank 6 to a seal oil tank 8. The seal oil tank 8 is the main tank for storage of the oil not used at the turbogenerator 25 at a certain time. The seal oil tank 8 contains no pressure but is around atmospheric pressure in the contrary to common tanks which contain a vacuum. When oil is taken out of the seal oil tank 8 then a mass deficit is caused in the seal oil tank 8. A certain mass of oil is continuously taken out of the seal oil tank 8. This mass of oil is required to seal the shaft of the turbogenerator 25 pumped from the seal oil tank 8. Typical values of taking from the seal oil tank 8 are 360-600 l per minute. Since the seal oil tank 8 and the separation tank 6 are at the same pressure and the mass of oil is taken out of the seal oil tank 8, the oil level in the seal oil tank 8 drops. This drop or mass deficit in turn causes the forced entrainment of oil from the separation tank 6 to the seal oil tank 8. A mass balance between the seal oil tank 8 and the separation tank 6 entrains oil from the separation tank 6 to the seal oil tank 8. The separation tank 6 and the seal oil tank 8 maintain the same oil level. A reverse flow from oil is not possible as long as pumps (not shown) assigned to the oil degassing system 1 are in operation and the oil is pumped to the turbogenerator 25. The mass deficit in the seal oil tank 8 avoids the fast flow from oil from the separation tank 6 to the turbogenerator 25. A direct and fast flow of oil to the turbogenerator 25 results in a contamination with gas and oil flooding the turbogenerator 25. The seal oil tank 8 has assigned a further oil mist separator 9 to further separate gas from the oil. The oil mist separator 9 can be designed as a known strainer based device that uses at least a fan to create a small negative pressure inside the oil mist separator 9. From the oil mist separator 9 the degassed oil is again supplied to the turbogenerator 25.

Figure 2:
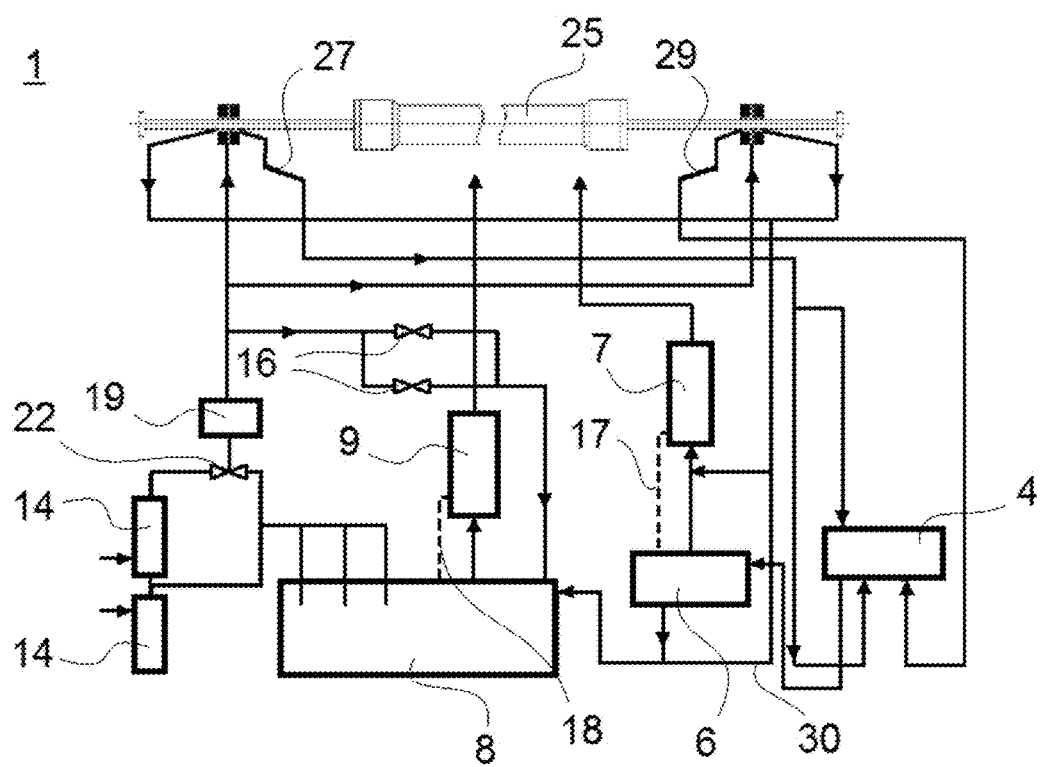
FIG. 2 shows a block diagram of another example of an industrial degassing system with additional coolers, a temperature control valve, a strainer, and two control valves assigned to the seal oil tank.

FIG. 2 shows a block diagram of another example of an industrial oil degassing system 1 similar to the example above. Here, the turbogenerator 25 is illustrated in a schematic manner with a shaft, the drive end inlet 27 and the non-drive end inlet 29 at the opposed end of the turbogenerator 25. A further inlet 30 supplies oil which returns from the drive end and the non-drive end directly to the seal oil tank 8. This return oil from the inlet 30 may contain mist, i.e. oil with trapped air bubbles. The oil charged with hydrogen is supplied through the drive end inlet 27 and the non-drive end inlet 29 to the pressure tank 4. The pressure tank 4 has a pressure inside. The main function of the pressure tank 4 is to collect oil which is returned from the drive end inlet 27 and the non-drive inlet 29 and to negate any differential pressure between these inlets 27, 29. The tubes of the drive end inlet 27 at the left divides into two paths to supply oil to the pressure tank 4. From the pressure tank 4 the oil is fed to the separation tank 6, as illustrated by the line with an arrow which represents a tube to transport the seal oil. The pressure tank 4 has a higher pressure than the separation tank 6. The separation tank 6 has an assigned oil mist separator 7 to assist the separation of the gas from the seal oil. The separation tank 6 holds the oil for several minutes, at least for the retention period which is required for natural oil degassing. The degassed oil is introduced to the oil mist separator 7 from the separation tank 6. The gas, especially hydrogen, is discharged from the oil mist separator 7 to the atmosphere. The degassed oil is returned from the oil mist separator 7 to the separation tank 6 via a drip conduct 17. The seal oil drips from the oil mist separator 7 into the separation tank 6, as illustrated by the dashed line. Next, the degassed oil flows from the separation tank 6 to the seal oil tank 8 which is the main tank to preserve the seal oil. The oil from the separation tank 6 is taken from the bottom of the separation tank 6 at which part the degassed oil collects. The flow of seal oil to the seal oil tank 8 occurs by natural flow without additional means to force the seal oil. The pipe which connects the separation tank 6 with the seal oil tank 8 functions as an oil interlock. This pipe contains a certain amount of oil that acts as a locking device so that air from the seal oil tank 8 does not flow to the separation tank 6. The oil settles down for several minutes within the seal oil tank 8. The seal oil tank 8 has no pressure but the atmospheric pressure. The seal oil tank 8 has an assigned oil mist separator 9 which additionally removes gas from the oil. The gas, especially air, is discharged from the oil mist separator 9 to the atmosphere. The degassed oil drips back to the seal oil tank 8 via a drip conduct 18, illustrated by the dashed line in FIG. 2. The seal oil in the seal oil tank 8 has different temperatures. Mainly for this reason two coolers 14 are arranged adjacent to the seal oil tank 8 to cool down seal oil with higher temperature. The cooling process is controlled by a temperature control valve 22. The temperature control valve 22 keeps the temperature of the supply oil at a constant temperature, e.g. 450C. The temperature control is performed by the temperature control valve 22 by means of mixing cold oil from the coolers 14 with warm oil from the seal oil tank 8. The seal oil flows from the seal oil tank 8 to the drive end and the non-drive end of the turbogenerator 25. In an option the reflowing oil passes a strainer 19 to filter the seal oil. From the strainer 19 the oil is transported to the drive end and in a branch-off pipe through two redundant control valves 16 arranged in parallel back to the seal oil tank 8. Excess oil returns back to the seal oil tank 8 through the valves 16. The control valves 16 regulate the oil supply pressure. The oil supplied to the drive end and to the non-drive end is maintained at a pressure of approximately 0.5 bar by the control valves 16. In a further option the pipes or tubes to transport the oil to the drive end and the non-drive end are equipped with a siphon. The pressure tank 4, the separation tank 6, and the seal oil tank 8 as main components of the oil degassing system 1 can be arranged in different heights. Then, the separation tank 6 is at a higher elevation than the seal oil tank 8, and the pressure tank 4 is at a higher elevation than the separation tank 6. This measure supplements the natural flow between the tanks 4, 6, 8 which natural flow is intended. The oil entrainments from the pressure tank 4 and the separation tank 6 to the seal oil tank 8 are due to the mass balance caused by pumping of oil by means of an assigned pump.

While the invention has been described in detail with reference to exemplary embodiments thereof, it will be apparent to one skilled in the art that various changes can be made, and equivalents employed, without departing from the scope of the invention. The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents.

The invention claimed is:

1. An industrial oil degassing system, comprising:
    a pressure tank under pressure to receive oil charged with gas, wherein the pressure tank has a connected oil mist separator from which oil drips into the pressure tank and the oil mist separator comprises at least a fan to create a pressure inside the pressure tank;
    a separation tank with an atmospheric pressure to separate gas from the oil, the separation tank connected to the pressure tank; and
    a seal oil tank with an atmospheric pressure to receive the degassed oil from the separation tank.

2. The industrial oil degassing system according to claim 1, wherein the oil received by the pressure tank is supplied by a drive end inlet of a turbogenerator and by a non-drive end inlet of the turbogenerator.

3. The industrial oil degassing system according to claim 1, wherein the oil received by the seal oil tank is supplied by a further inlet from the drive end and the non-drive end, and from an outlet of the pressure tank.

4. The industrial oil degassing system according to claim 1, wherein the pressure tank houses a perforated wall for damping the pressure.

5. The industrial oil degassing system according to claim 1, wherein at least a cooler controlled by a temperature control valve achieves the mixing of hot and cold oil within the seal oil tank.

6. The industrial oil degassing system according to claim 1, further comprising pipes to return the oil after degassing are equipped with a siphon and/or the drive end inlet is connected with the non-drive end inlet by a siphon.

7. The industrial oil degassing system according to claim 1, wherein the separation tank contains hydrogen to be degassed and the seal oil tank contains air to be degassed.

8. A method for industrial degassing of oil comprising:
    exerting a pressure to a pressure tank, the exerting comprising the step of dripping oil from an oil mist separator into the pressure tank and creating pressure inside the pressure tank by at least a fan at the oil mist separator;
    supplying the oil to the pressure tank;
    supplying the oil from the pressure tank to a separation tank with atmospheric pressure;
    separating gas from the oil in the separation tank; and
    supplying the degassed oil to a seal oil tank with atmospheric pressure.

9. The method according to claim 8, wherein the step of supplying the oil to the pressure tank is by a drive end inlet of a turbogenerator and by a non-drive end inlet of the turbogenerator.

10. The method according to claim 8, further comprising the step of damping the pressure in the pressure tank by an included perforated wall.

* * * * *